United States Patent
Freund et al.

(12) 
(10) Patent No.: US 6,505,250 B2
(45) Date of Patent: Jan. 7, 2003

(54) APPARATUS AND METHOD FOR SCHEDULING AND DISPATCHING QUEUED CLIENT REQUESTS WITHIN A SERVER IN A CLIENT/SERVER COMPUTER SYSTEM

(75) Inventors: Thomas Freund, Winchester (GB); Iain Stuart Caldwell Houston, Sherborne (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/141,445

(22) Filed: Aug. 27, 1998

(65) Prior Publication Data

US 2001/0039575 A1 Nov. 8, 2001

(30) Foreign Application Priority Data

Feb. 4, 1998 (GB) .............................. 9802294

(51) Int. Cl.$^7$ ............................................ G06F 15/173
(52) U.S. Cl. ........................................................ 709/226
(58) Field of Search ............................... 709/201, 103, 709/102, 226, 101, 104, 105, 107

(56) References Cited

U.S. PATENT DOCUMENTS

| | | | |
|---|---|---|---|
| 5,247,677 A | * 9/1993 | Welland et al. | 709/103 |
| 5,317,568 A | 5/1994 | Bixby et al. | 370/85.6 |
| 5,440,744 A | 8/1995 | Jacobson et al. | 395/650 |
| 5,506,987 A | 4/1996 | Abramson et al. | 395/650 |
| 5,752,031 A | * 5/1998 | Cutler | 709/103 |
| 5,826,081 A | * 10/1998 | Zolnowsky | 709/103 |
| 5,925,098 A | * 7/1999 | Freund et al. | 709/203 |
| 5,940,612 A | * 8/1999 | Brady et al. | 709/103 |
| 6,006,247 A | * 12/1999 | Brownin | 709/102 |
| 6,023,722 A | * 2/2000 | Colyer | 709/201 |
| 6,317,774 B1 | * 11/2001 | Jones et al. | 709/107 |

FOREIGN PATENT DOCUMENTS

| | | | |
|---|---|---|---|
| EP | 652513 | 5/1995 | G06F/9/46 |
| GB | 2320594 | 6/1998 | G06F/9/46 |
| JP | 8286962 | 11/1996 | G06F/12/00 |

* cited by examiner

Primary Examiner—Glenton B. Burgess
Assistant Examiner—Tod Kupstas
(74) Attorney, Agent, or Firm—A. Bruce Clay

(57) ABSTRACT

An apparatus for scheduling and dispatching client requests for execution by a server object in a heterogeneous object-oriented client/server computing environment, the apparatus comprising: a request-holding buffer having an input connected to a communications channel which channels the client requests to the apparatus, and an output; a plurality of parallel execution threads connected to the output of the buffer; and a scheduling means for distributing client requests stored in the buffer to the plurality of execution threads, characterized in that: the scheduling means places client requests held in the buffer in priority order based on a priority determining rule which takes into account the state of the plurality of execution threads and the nature of each of the held requests.

12 Claims, 3 Drawing Sheets

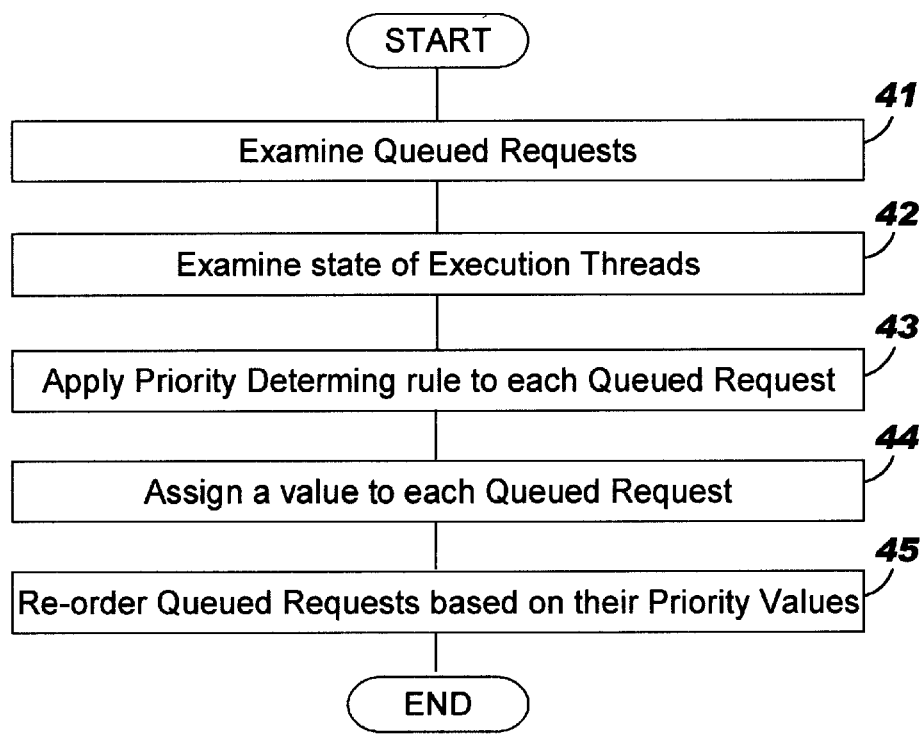

APPARATUS AND METHOD FOR SCHEDULING AND DISPATCHING QUEUED CLIENT REQUESTS WITHIN A SERVER IN A CLIENT/SERVER COMPUTER SYSTEM

FIELD OF THE INVENTION

The invention relates to the field of client/server (also known as "distributed") computing, where one computing device ("the client") requests another computing device ("the server") to perform part of the client's work.

BACKGROUND OF THE INVENTION

Client/server computing has become more and more important over the past few years in the information technology world. This type of distributed computing allows one machine to delegate some of its work to another machine that might be, for example, better suited to perform that work.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example, of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms as is shown in FIG. 1. The OMG has set forth published standards by which client computers (e.g. 10) communicate (in OOP form) with server machines (e.g. 20). As part of these standards, an Object Request Broker has been defined, which provides the object-oriented bridge between the client and the server machines. The ORB decouples the client and server applications from the object oriented implementation details, performing at least part of the work of the first and second logic means 50 and 90 as well as the connection means 80.

FIG. 2 shows a conventional architecture for such a system. Once client requests find their way through the ORB 21 and into the server, the ORB finds a particular server object capable of executing the request and sends the request to that server object's object adapter 22 (also defined by OMG standard) where it is stored in the object adapter's buffer to await processing by the server object. The buffer is a First-In-First-Out queue, meaning that the first request received in the buffer at one end thereof is the first to leave out the other end. The server object has a plurality of parallel execution threads (23a, 23b, 23c) upon any of which it can run an instance of itself. In this way, the server object is able to process plural requests at the same time. The object adapter 22 looks to see which of the parallel execution threads is ready to process another request and assigns the request located at the end of the buffer to the next available execution thread. This is explained in the above-mentioned U.S. Patent as a "dispatching" mechanism whereby the server dispatches queued requests to execution threads.

One major problem with this prior architecture is that it is not possible to obtain a predictable response time for the execution of a client request. That is, a particular client request could be sitting in a server object's object adapter queue 22 behind a large number of other requests, or, at another time, the particular client request could be the only request in the queue. The client that is waiting for an answer cannot predict when a response will be received from the server object. Another problem is that a very important client request may have to wait behind many not so important requests in the object adapter queue.

These predictability problems dissuade the use of heterogeneous client/server systems to perform distributed processing, leaving such distributed processing to be carried out on homogeneous client/server architectures (such as computer terminals accessing host mainframe computers) especially where a guaranteed, predictable and consistent execution environment is required.

SUMMARY OF THE INVENTION

According to one aspect, the present invention provides an apparatus for scheduling and dispatching client requests for execution by a server object in a heterogeneous object-oriented client/server computing environment, the apparatus comprising: a request-holding buffer having an input connected to a communications channel which channels the client requests to the apparatus, and an output; a plurality of parallel execution threads connected to the output of the buffer; and a scheduling means for distributing client requests stored in the buffer to the plurality of execution threads, characterized in that: the scheduling means places client requests held in the buffer in priority order based on a priority determining rule which takes into account the state of the plurality of execution threads and the nature of each of the held requests.

Preferably, the buffer is included within an object adapter.

Preferably, the scheduling means assigns priority values to each request in the buffer by applying the priority determining rule and places higher priority valued requests ahead of lower priority valued requests in the buffer so that the highest priority valued request is scheduled next for execution by the server object.

According to a second aspect, the present invention provides a method of scheduling and dispatching client requests for execution by a server object in a heterogeneous object-oriented client/server computing environment, comprising the steps of: determining information about each of a plurality of queued incoming client requests; determining information about each of a plurality of parallel execution threads of the server object; applying a priority determining rule to the information obtained in said determining steps; and scheduling the order of dispatch from the queue of the plurality of queued requests based on the results of said applying step.

According to third aspect, the present invention provides a computer program product for, when run on a computer, carrying out the method of the second aspect of the invention.

Thus, with the present invention, queued client requests can be processed in a much more efficient and controllable manner, greatly enhancing the predictability of processing result which is returned to the client. High priority client requests can be processed before lower priority requests and workload management amongst the execution threads can be effected, to provide highly efficient and predictable processing of the queued requests.

BRIEF DESCRIPTION OF THE DRAWINGS

The above-described invention will be better understood by reference to the detailed description of a preferred embodiment presented below, in conjunction with the following drawing figures:

FIG. 4 is a flow chart showing the processing steps involved according to a preferred embodiment of the present invention;

FIG. 5 shows the requests in the object adapter's queue after priorities have been assigned, according to a preferred embodiment of the present invention; and FIG. 6 shows the requests in the object adapter's queue after the requests have been re-ordered according to their assigned priorities, according to a preferred embodiment of the present invention.

DETAILED DESCRIPTION OF THE PREFERRED EMBODIMENT

Figure 1:
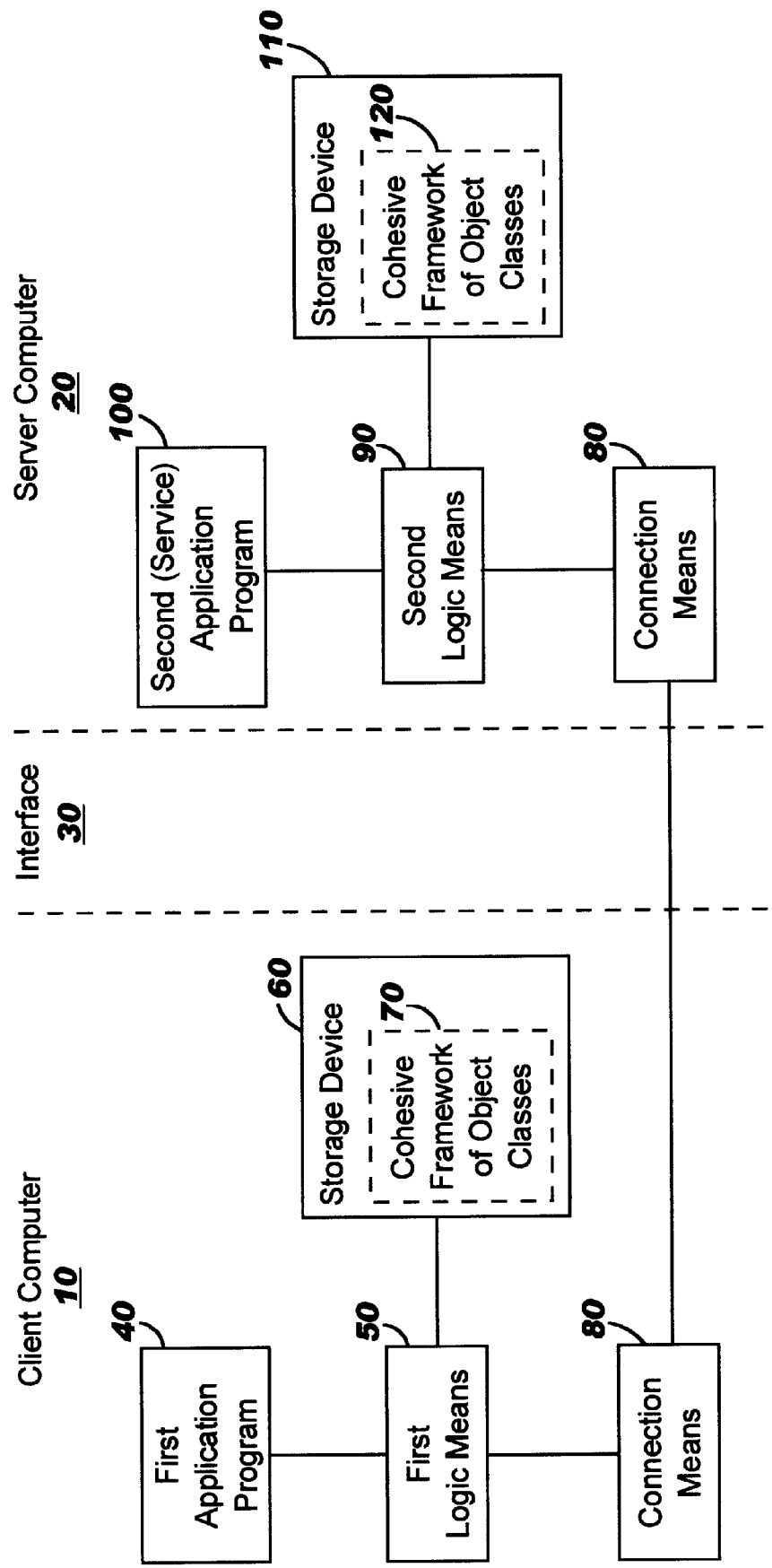
FIG. 1 is a block diagram of a well-known heterogeneous client/server architecture using object technology, in the context of which the present invention can be applied.
Figure 2:
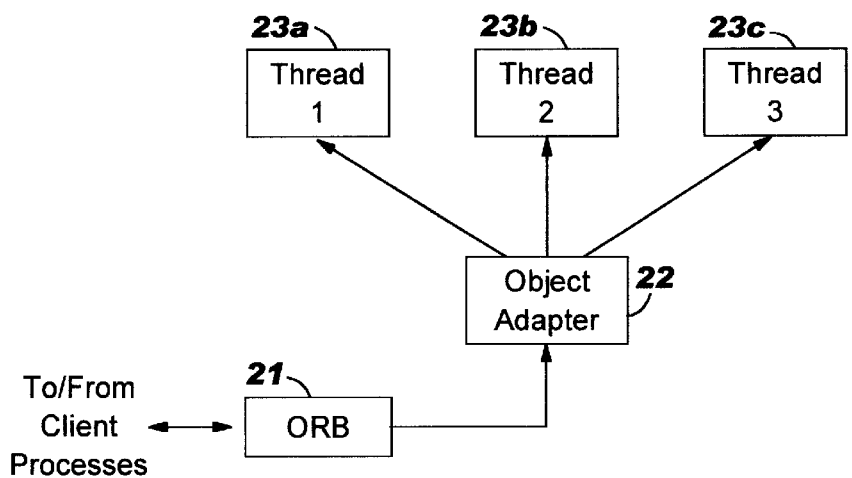
FIG. 2 is a block diagram of a server architecture according to a conventional design.
Figure 3:
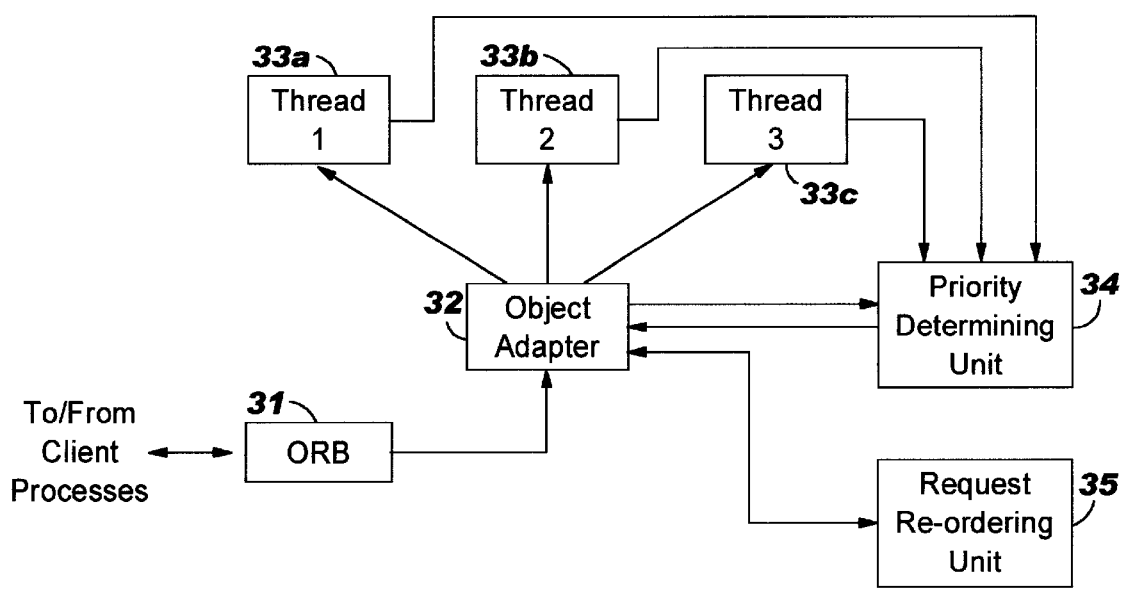
FIG. 3 is a block diagram of a server architecture according to a preferred embodiment of the present invention.

In the preferred embodiment of FIG. 3, requests received at the server process from client processes are first received by the server's ORB 31. ORB 31 then passes on requests destined to a particular server object to that server object's object adapter 32. This server object has a number of parallel execution threads 33a, 33b and 33c where different instances of the server object can be running in parallel, in order to execute a large number of client requests. This is all analogous to the prior art of FIG. 2 that was described above.

Extra software units are added to the prior art of FIG. 2, according to the present invention's preferred embodiment of FIG. 3. These extra units are a priority determining unit 34 and a request re-ordering unit 35. The priority determining unit 34 receives an input from the object adapter 32 and also receives inputs from each of the execution threads 33a to 33c and provides an output to the object adapter 32. The request re-ordering unit 35 has an input/output connection to/from the object adapter 32.

In the example that will be described hereinbelow to illustrate the operation of this preferred embodiment, the server object will represent a bank account. Thus, the various requests that are queued in object adapter 32 are requests to access a particular bank account. One queued request is from a client ATM (automated teller machine) to withdraw funds from this account. This request is from the person owning the account who wishes to withdraw some funds. A second queued request is from a direct deposit salary payer client. This request is from the account owner's employer and the employer is adding the employer's monthly salary into the account owner's bank account. A third queued request is from another client ATM to check the balance of the account. This request is from the account owner's wife, who is on the other side of town from the owner at another client ATM machine. A fourth queued request is a direct debit request from the electricity company that supplies electricity to the account owner's household. The request is a debit of the account for the amount of the monthly electricity bill.

The priority determining unit 34 operates according to a programmed rule in order to determine the priority of the queued requests in object adapter 32 that are awaiting execution by the server object. For example, one part of the rule is that requests to check the balance of the account should be given a low priority value, since the reply to this request will be more informative to the client if other pending requests are executed first. That is, if a large amount of money is going to be debited from the account by a direct debit, it is better that the person requesting the balance of the account be given the balance after the direct debit rather than before the direct debit. This gives a more current version of the balance to the person requesting the balance.

Another part of the rule is that if threads 33a, 33b and 33c are heavily loaded (are performing a high level of processing as compared to normal) requests which involve an easier processing load are given a higher priority value. For example, the request to add the account owner's salary may not involve much client interaction, such as a PIN (personal identification number) checking routine to authenticate the client, since this is a request to add money to an account, not a request to withdraw money. Thus, this request may involve a lighter processing load and should be given a higher priority during a time when the execution threads are heavily loaded.

Another part of the rule could be that a request from a certain client should be given priority over other clients in the queue. For example, the owner of the bank account that is waiting at the ATM machine can be given priority over the direct debit and direct deposit requests. Alternatively, a direct deposit request can be given priority over any debit request so as to increase the chances that there will be enough funds in the account to cover the debits.

The exact details of the rule can be set in the specific way the programmer wants them, thus allowing very flexible control over the priority determination carried out by the priority determining unit 34.

The priority determining unit 34, thus, takes inputs from the queued requests in object adapter 32 in order to determine the nature of each of the queued requests. The priority determining unit 34 also takes inputs from each of the execution threads 33a, 33b and 33c in order to determine the current state thereof. The priority determining unit 34 then assigns to each queued request a priority value from a range of priority values, ranging from a highest value to a lowest value.

Request re-ordering unit 35 then examines the priority values assigned to each of the queued requests and re-orders the queued requests according to their priority values so that the highest priority valued request is at the top of the queue to be next dispatched to an execution thread, and the other requests are placed in descending order according to descending priority values.

It should be noted that the order of the queued requests can be dynamically changed, that is, the order can be changed even after the request re-ordering unit 35 has re-ordered the requests, if the state of the system has changed. For example, if thread 33b suddenly becomes free after the request re-ordering unit 35 has re-ordered the queued requests, priority determining unit 34 now follows a part of the programmed rule that states that if thread 33b becomes free then a computation-intensive request (e.g., the request of the account owner to withdraw funds from the ATM, which involves PIN checking and other client interaction) should be given a high priority value. This may be, for example, that thread 33b is particularly well adapted for handling heavy processing loads, so if it becomes free, an appropriate request should be scheduled as soon as possible for execution on thread 33b in order to provide as efficient a workload balancing amongst threads as possible. In this regard, the frequency with which the priority determining unit applies the rule to its inputs can also be set by the programmer. One choice might be each time a new request is received in the queue. Another may be each time a request is dispatched from the queue. A third choice may be after a predetermined time period (e.g., 5 seconds) has elapsed.

Again, the rule followed by priority determining unit 34 can be programmed to suit the exact concerns of the programmer. For example, the exact levels of priority can be set to give higher priority to a heavy processing request when thread 33b becomes free as compared to an account balance inquiry request, if the programmer decides that it is more important to efficiently balance the workload as compared to giving a most recent account balance to a client.

The steps carried out by the preferred embodiment of the present invention are illustrated in the flowchart of FIG. 4.

At step 41, the priority determining unit 34 examines each of the requests sitting in the queue of the object adapter 32. At step 42, the priority determining unit 34 examines the state of each of the execution threads 33a, 33b and 33c. At step 43, the priority determining unit uses the information that it has gathered from steps 41 and 42 as inputs to a priority determination rule. As stated above, this rule has been pre-programmed to reflect the priority determinations desired by the programmer.

At step 44, the priority determining unit 34 assigns a value to each of the queued requests based on the results of having applied the priority determination rule to each queued request at step 43. Specifically, each request sitting in the queue of the object adapter 32 is assigned a numerical value, such a value being dependent on the results of the application of the priority determining rule for that request.

For example, as shown in FIG. 5, there are three requests sitting in the queue of the object adapter 32: request_one (which would be the next request to leave the queue, if the FIFO system of the prior art were used), request_two (sitting immediately behind request_one) and request_three (sitting immediately behind request_two). If, when the rule is applied at step 43, request_one is assigned the priority value 2, request_two is assigned the priority value 3 and request_three is assigned the priority value 1, then these numerical values are stored in column 502 which is alongside column 501 which lists each of the queued requests.

At step 45, the request re-ordering unit 35 examines column 502 of the object adapter 32's queue and re-orders the requests in column 501 so that the highest priority request (request_three) is placed at the top of column 501 (see FIG. 6), and the other two requests are placed in order behind this first request according to their assigned priority.

The present invention thus provides, to the distributed heterogeneous processing platform context, the highly predictable and efficient results required by today's commercial processing environments. A large number of clients can thus be given efficient usage of the available server resources through system-wide workload balancing. Also, clients are provided with consistent and highly predictable results from the server, in terms of a guaranteed processing time each time a client invokes a server object located on a heterogeneous platform.

We claim:

1. An apparatus for scheduling and dispatching client requests for execution by a server object in a heterogeneous object-oriented client/server computing environment, the apparatus comprising:

a request-holding buffer having an input connected to a communications channel which channels the client requests to the apparatus, and an output;

a plurality of parallel execution threads connected to the output of the buffer, upon each of the plurality of parallel execution threads the server object runs an instance of itself thereby allowing the server object to process a plurality of requests at the same time; and a scheduling means for distributing client requests stored in the buffer to the plurality of execution threads;

wherein the scheduling means places client requests held in the buffer in priority order-based on a priority determining rule which takes into account a current processing load of the plurality of execution threads and the nature of each of the held requests.

2. The apparatus of claim 1 wherein said buffer is included within an object adapter.

3. The apparatus of claim 1 wherein the scheduling means assigns priority values to each request in the buffer by applying the priority determining rule and places higher priority valued requests ahead of lower priority valued requests in the buffer so that the highest priority valued request is scheduled next for execution by the server object.

4. The apparatus of claim 1 wherein the communications channel involves an object request broker.

5. A method of scheduling and dispatching client requests for execution by a server object in a heterogeneous object-oriented client/server computing environment, comprising the steps of:

determining information about each of a plurality of queued incoming client requests;

determining a current processing load of each of a plurality of parallel execution threads of the server object, wherein upon each of the plurality of parallel execution threads the server object the server object runs an instance of itself thereby allowing the server object to process a plurality of requests at the same time;

applying a priority determining rule to the information obtained in said determining steps; and scheduling the order of dispatch from the queue of the plurality of queued requests based on the results of said applying step.

6. The method of claim 5 wherein said queued client requests are stored within an object adapter.

7. The method of claim 5 wherein the applying step results in the assignment of priority values to each queued request by applying the priority determining rule and the scheduling step places higher priority valued requests ahead of lower priority valued requests in the queue so that the highest priority valued request is scheduled next for execution by the server object.

8. The method of claim 5 wherein a frequency with which said applying step is carried out is selected by a programmer.

9. The method of claim 5 wherein the communications channel involves an object request broker.

10. A computer program product stored on a computer, readable storage medium for, when run on a computer system, carrying out the method of claim 5.

11. A computer program product as claimed in claim 10 wherein the communications channel involves an object request broker.

12. The computer program product of claim 10 said queued client requests are stored within an object adapter.

* * * * *